United States Patent
Joo et al.

(10) Patent No.: US 10,732,824 B2
(45) Date of Patent: Aug. 4, 2020

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Sihyun Joo, Seoul (KR); Dongsoo Shin, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 228 days.

(21) Appl. No.: 15/620,404

(22) Filed: Jun. 12, 2017

(65) Prior Publication Data
US 2018/0173413 A1 Jun. 21, 2018

(30) Foreign Application Priority Data

Dec. 16, 2016 (KR) .................. 10-2016-0172355

(51) Int. Cl.
*G06F 3/0488* (2013.01)
*B60K 37/02* (2006.01)
*B60W 50/08* (2020.01)

(52) U.S. Cl.
CPC .......... *G06F 3/04883* (2013.01); *B60K 37/02* (2013.01); *B60K 2370/143* (2019.05); *B60K 2370/1476* (2019.05); *B60W 50/08* (2013.01)

(58) Field of Classification Search
CPC ............... G06F 3/04883; B60K 37/02; B60K 2350/1024
See application file for complete search history.

(56) References Cited

U.S. PATENT DOCUMENTS

| 5,864,635 A | * | 1/1999 | Zetts | G06F 3/04883 382/187 |
| 2013/0106693 A1 | * | 5/2013 | Okuyama | G06F 3/0482 345/157 |
| 2013/0271397 A1 | * | 10/2013 | MacDougall | G06F 3/017 345/173 |
| 2014/0351740 A1 | | 11/2014 | Li et al. | |
| 2016/0018902 A1 | * | 1/2016 | Nasiri | G06F 1/1694 463/38 |

FOREIGN PATENT DOCUMENTS

| JP | 2015-522883 A | 8/2015 |
| KR | 10-2012-0062168 A | 6/2012 |
| KR | 10-2015-0020337 A | 2/2015 |

* cited by examiner

*Primary Examiner* — Stella Higgs
(74) *Attorney, Agent, or Firm* — Morgan, Lewis & Bockius LLP

(57) ABSTRACT

A vehicle includes a display for providing a character input interface, a touch input apparatus for sensing a plurality of sub gestures sequentially through a touch portion, and a controller for controlling the character input interface to display, when a difference between a direction of a first sub gesture of the plurality of sensed sub gestures and a direction of a second sub gesture sensed within a first delay time period starting at a time at which the first sub gesture ends is greater than or equal to a reference direction difference, a character corresponding to a gesture including the first sub gesture and the second sub gesture.

15 Claims, 15 Drawing Sheets

VEHICLE AND CONTROL METHOD THEREOF

CROSS-REFERENCE TO RELATED APPLICATION

This application claims the benefit of priority to Korean Patent Application No. 10-2016-0172355, filed on Dec. 16, 2016 with the Korean Intellectual Property Office, the disclosure of which is incorporated herein by reference.

TECHNICAL FIELD

Implementations of the present disclosure relate to a vehicle including a touch input apparatus for sensing gestures, and a method of controlling the vehicle.

BACKGROUND

With development of vehicle-related technologies, many vehicles include various functions for improving a passenger's convenience. However, the more functions a vehicle has, the more operating load a driver experiences. Excessive operating load may deteriorate a driver's concentration on driving, adversely affecting safe driving. Also, as a vehicle includes more functions, a driver's difficulties in operating the vehicle may increase accordingly so that a driver who is inexperienced in operating a vehicle may be not able to properly use all vehicle functions.

In order to overcome these problems, studies into a vehicle-mounted input device for reducing a driver's operating load and difficulties have been conducted. A representative example of such a vehicle-mounted input device is a touch input device capable of detecting a driver's touch inputs. If a vehicle includes such a touch input device, a driver would be able to easily control the vehicle by touching the touch input device without having to perform complicated manipulations.

SUMMARY

Therefore, it is an aspect of the present disclosure to provide a vehicle of displaying, if a plurality of sub gestures made in different directions are sensed sequentially, a character corresponding to a gesture including the sensed sub gestures, and a method of controlling the vehicle.

Additional aspects of the disclosure will be set forth in part in the description which follows and, in part, will be obvious from the description, or may be learned by practice of the disclosure.

In accordance with one aspect of the present disclosure, a vehicle includes a display configured to provide a character input interface; a touch input apparatus to sense a plurality of sub gestures sequentially through a touch portion; and a controller configured to control the character input interface to display, if a difference between a direction of a first sub gesture of the plurality of sensed sub gestures and a direction of a second sub gesture sensed within a first delay time period from time at which the first sub gesture ends is greater than or equal to a reference direction difference, a character corresponding to a gesture including the first sub gesture and the second sub gesture.

If the difference between the direction of the first sub gesture and the direction of the second sub gesture is smaller than the reference direction difference, the controller may compare a difference between a start location of the first sub gesture and a start location of the second sub gesture to a reference start location difference to determine whether to display the character corresponding to the gesture including the first sub gesture and the second sub gesture.

If the difference between the start location of the first sub gesture and the start location of the second sub gesture is greater than or equal to the reference start location difference, the controller may control the character input interface to display the character corresponding to the gesture including the first sub gesture and the second sub gesture.

If the difference between the start location of the first sub gesture and the start location of the second sub gesture is smaller than the reference start location difference, the controller may control the character input interface sequentially according to control commands respectively corresponding to the first sub gesture and the second sub gesture.

If the difference between the start location of the first sub gesture and the start location of the second sub gesture is smaller than the reference start location difference, and a difference between a speed of the first sub gesture and a speed of the second sub gesture is smaller than a reference speed difference, the controller may control the character input interface sequentially according to control commands respectively corresponding to the first sub gesture and the second sub gesture.

If the difference between the start location of the first sub gesture and the start location of the second sub gesture is smaller than the reference start location difference, and a difference between a length of the first sub gesture and a length of the second sub gesture is smaller than a reference length difference, the controller may control the character input interface sequentially according to control commands respectively corresponding to the first sub gesture and the second sub gesture.

The controller may control the character input interface according to a control command corresponding to the first sub gesture, and then controls the character input interface according to a control command corresponding to the second sub gesture, when a third sub gesture is sensed within the first delay time period from time at which the second sub gesture ends, or just after the first delay time period elapses from the time at which the second sub gesture ends.

If there is no control command corresponding to at least one of the first sub gesture and the second sub gesture, the controller may control the character input interface to display the character corresponding to the gesture including the first sub gesture and the second sub gesture.

The controller may control the character input interface to display the character corresponding to the gesture including the first sub gesture and the second sub gesture, just after a second delay time period elapses from time at which the gesture ends, wherein the second delay time period is longer than the first delay time period.

If no sub gesture is sensed within the second delay time period from time at which a fourth sub gesture of the plurality of sensed sub gestures ends, the controller may control the character input interface according to a control command corresponding to the fourth sub gesture.

The vehicle may further comprise a storage device including a first buffer configured to store the plurality of sensed sub gestures sequentially, and a second buffer configured to store a plurality of control commands corresponding to the plurality of sensed sub gestures.

In accordance with another aspect of the present disclosure, a method of controlling a vehicle, includes providing a character input interface; sensing a plurality of sub gestures sequentially through a touch input apparatus of the vehicle; and displaying a character corresponding to a gesture including the first sub gesture and the second sub gesture through the character input interface, if a difference between a direction of a first sub gesture of the plurality of sensed sub gestures and a direction of a second sub gesture sensed within a first delay time period from time at which the first sub gesture ends is greater than or equal to a reference direction difference.

The displaying of the character may comprise, if the difference between the direction of the first sub gesture and the direction of the second sub gesture is smaller than the reference direction difference, comparing a difference between a start location of the first sub gesture and a start location of the second sub gesture to a reference start location difference to determine whether to display the character corresponding to the gesture including the first sub gesture and the second sub gesture.

The displaying of the character may further comprise, if the difference between the start location of the first sub gesture and the start location of the second sub gesture is greater than or equal to the reference start location difference, displaying the character corresponding to the gesture including the first sub gesture and the second sub gesture through the character input interface.

The method may further comprise, if the difference between the start location of the first sub gesture and the start location of the second sub gesture is smaller than the reference start location difference, controlling the character input interface sequentially according to control commands respectively corresponding to the first sub gesture and the second sub gesture.

The sequentially controlling of the character input interface may comprise, if the difference between the start location of the first sub gesture and the start location of the second sub gesture is smaller than the reference start location difference, and a difference between a speed of the first sub gesture and a speed of the second sub gesture is smaller than a reference speed difference, controlling the character input interface sequentially according to control commands respectively corresponding to the first sub gesture and the second sub gesture.

The sequentially controlling of the character input interface may comprise, if the difference between the start location of the first sub gesture and the start location of the second sub gesture is smaller than the reference start location difference, and a difference between a length of the first sub gesture and a length of the second sub gesture is smaller than a reference length difference, controlling the character input interface sequentially according to control commands respectively corresponding to the first sub gesture and the second sub gesture.

The sequentially controlling of the character input interface may comprise controlling the character input interface according to a control command corresponding to the first sub gesture, and then controlling the character input interface according to a control command corresponding to the second sub gesture, when a third sub gesture is sensed within the first delay time period from time at which the second sub gesture ends, or just after the first delay time period elapses from the time at which the second sub gesture ends.

The displaying of the character may comprise, if there is no control command corresponding to at least one of the first sub gesture and the second sub gesture, displaying the character corresponding to the gesture including the first sub gesture and the second sub gesture through the character input interface.

The displaying of the character may comprise displaying the character corresponding to the gesture including the first sub gesture and the second sub gesture through the character input interface, just after a second delay time period elapses from time at which the gesture ends, wherein the second delay time period is longer than the first delay time period.

The method may further comprise, if no sub gesture is sensed within the second delay time period from time at which a fourth sub gesture of the plurality of sensed sub gestures ends, controlling the character input interface according to a control command corresponding to the fourth sub gesture.

The method may further comprise storing the plurality of sensed sub gestures sequentially in a first buffer of the vehicle; and storing a plurality of control commands corresponding to the plurality of sensed sub gestures in a second buffer of the vehicle.

BRIEF DESCRIPTION OF THE DRAWINGS

These and/or other aspects of the disclosure will become apparent and more readily appreciated from the following description of the implementations, taken in conjunction with the accompanying drawings of which.

DETAILED DESCRIPTION

Hereinafter, a vehicle and a control method thereof will be described in detail with reference to the accompanying drawings.

Figure 1:
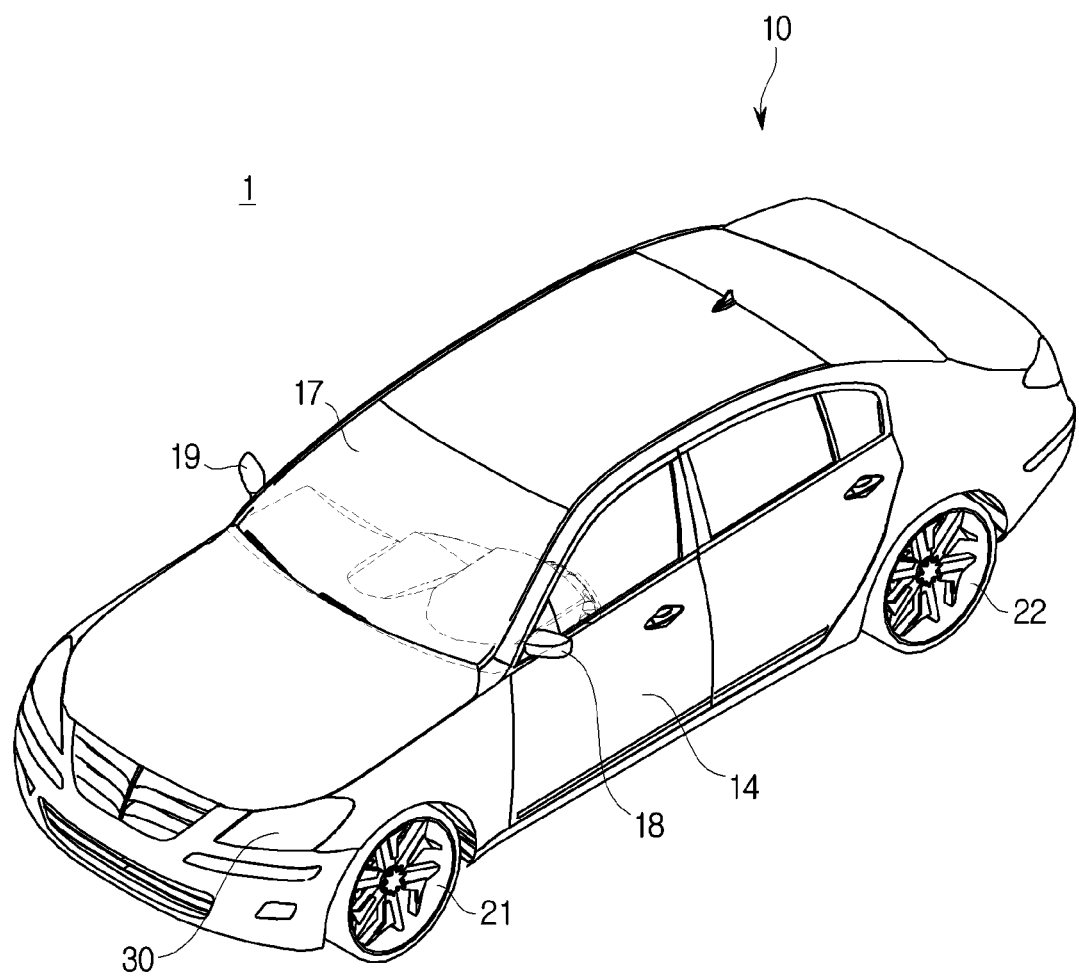
FIG. 1 shows an outer appearance of a vehicle according to exemplary implementations of the present disclosure.

FIG. 1 shows an outer appearance of a vehicle according to examplary implementations of the present disclosure.

Referring to FIG. 1, a vehicle 1 according to implementations of the present disclosure may include a main body 10 forming the outer appearance of the vehicle 1, wheels 21 and 22 to move the vehicle 1, doors 14 to shield the interior of the vehicle 1 from the outside, a front glass 17 to provide a driver inside the vehicle 1 with a front view of the vehicle 1, and side-view mirrors 18 and 19 to provide the driver with rear views of the vehicle 1.

The wheels 21 and 22 may include front wheels 21 provided in the front portion of the vehicle 1, and rear wheels 22 provided in the rear portion of the vehicle 1. The front wheels 21 or the rear wheels 22 may receive rotatory power from a driving apparatus 700 which will be described later to move the main body 10 forward or backward.

The doors 14 may be rotatably provided in the left and right sides of the main body 10 to allow the driver to open one of them and get into the vehicle 1. Also, the doors 14 may shield the interior of the vehicle 1 from the outside when all of them close.

The front glass 17 may be provided in the upper, front portion of the main body 10 to provide the driver inside the vehicle 1 with a front view of the vehicle 1. The front glass 17 is also called a windshield glass.

The side-view mirrors 18 and 19 may include a left side-view mirror 18 provided in the left side of the main body 10, and a right side-view mirror 19 provided in the right side of the main body 10 to provide the driver inside the vehicle 1 with rear and side views of the vehicle 10.

Figure 2:
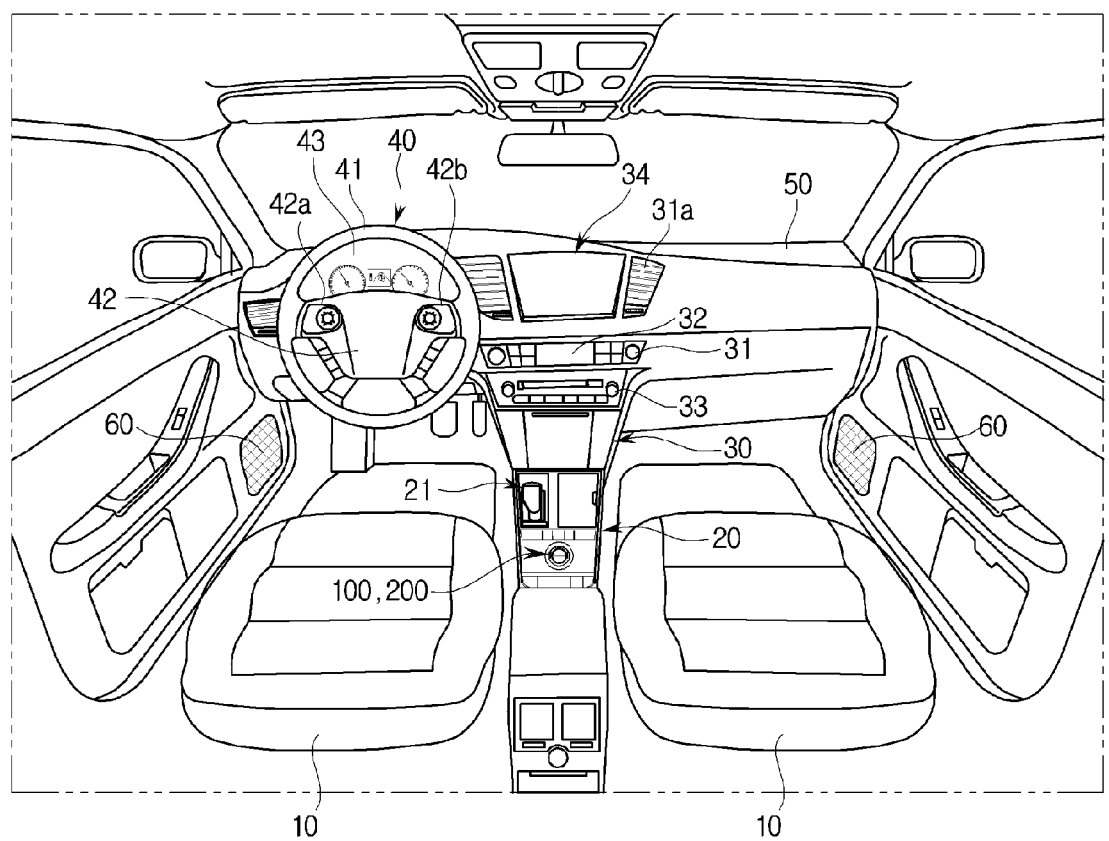
FIG. 2 shows an interior of a vehicle according to exemplary implementations of the present disclosure.

FIG. 2 shows an interior of a vehicle according to exemplary implementations of the present disclosure.

Referring to FIG. 2, the vehicle 1 may include a plurality of seats 10 in which a driver, etc. sit, and a dashboard 50 on which a gear box 20, a center fascia 30, and a steering wheel 40 are provided.

The gear box 20 may include a transmission lever 24 for shifting gears, and a dial manipulator 22 for controlling function execution of the vehicle 1.

The steering wheel 40 installed in the dashboard 50 may be used to change the driving direction of the vehicle 1. The steering wheel 40 may include a rim 41 that can be gripped by a driver, and a spoke 42 connected to a steering apparatus of the vehicle 1 and connecting the rim 31 to a hub of a rotation shaft for steering. According to an implementation, the spoke 42 may include a plurality of manipulators 42a and 42b for controlling various devices (for example, audio system) of the vehicle 1.

A cluster 43 may display a speed gauge representing the speed of the vehicle 1, and an RPM gauge representing the RPM of the vehicle 1, so that a driver can check information about the vehicle 1 at once. Also, the cluster 43 may display information about the vehicle 1, particularly, information related to driving of the vehicle 1. For example, the cluster 43 may display a Distance To Empty (DTE) calculated based on the amount of remaining fuel, navigation information, audio information, etc.

The cluster 43 may be disposed in an area facing the steering wheel 40 on the dashboard 50, so that the driver can check information about the vehicle 1 without moving his/her eyes looking ahead.

Although not shown in the drawings, the dashboard 50 may include a Head Up Display (HUD) to display visual information for the driver on the front glass 17.

In the center fascia 30 provided on the dashboard 50, an air conditioner 31, a clock 32, an audio system 33, a display, etc. may be installed.

The air conditioner 31 may adjust the temperature, humidity, air quality, and flow of air inside the vehicle 1 to maintain pleasant conditions inside of the vehicle 1. The air conditioner 31 may include at least one vent 31a installed in the center fascia 30 and configured to discharge air. In the center fascia 30, at least one button or dial for controlling the air conditioner 31, etc. may be provided. A driver or passenger may use the button provided on the center fascia 30 to control the air conditioner 31.

The clock 32 may be positioned around the button or dial for controlling the air conditioner 31.

The audio system 33 may include an operating panel on which a plurality of buttons for executing the functions of the audio system 33 may be arranged. The audio system 33 may provide a radio mode to provide a radio function, and a media mode to reproduce an audio file stored in storage medium that stores audio files.

The audio system 33 may output an audio file as sound through a speaker 60. FIG. 2 shows an example in which the speaker 60 is installed in the inside of the doors 14, however, the speaker 60 may be provided at any other location.

The display 34 may display various information directly or indirectly related to the vehicle 1. For example, the display 34 may display direct information, such as navigation information of the vehicle 1, state information of the vehicle 1, etc., and indirect information, such as multimedia information including images and moving images received from an internal device of the vehicle 1 or from an external device.

Also, the display 34 may display a user interface to enable a user to input characters, which will be described later.

The display 34 may be a Liquid Crystal Display (LCD), a Light Emitting Diode (LED) display, a Plasma Display Panel (PDP) display, an Organic Light Emitting Diode (OLED) display, or a Cathode Ray Tube (CRT) display, although the disclosure is not limited to these.

Also, the dashboard 50 may further include a touch input apparatus 100 or 200 to sense the driver's touch input to generate a control command. If the user interface to enable a user to input characters is displayed on the display 34, the driver may change the type of characters through the touch input apparatus 100 or 200.

Hereinafter, a vehicle deciding a sensed gesture as any one of a control command or a character input command according to delay time will be described in detail.

Figure 3:
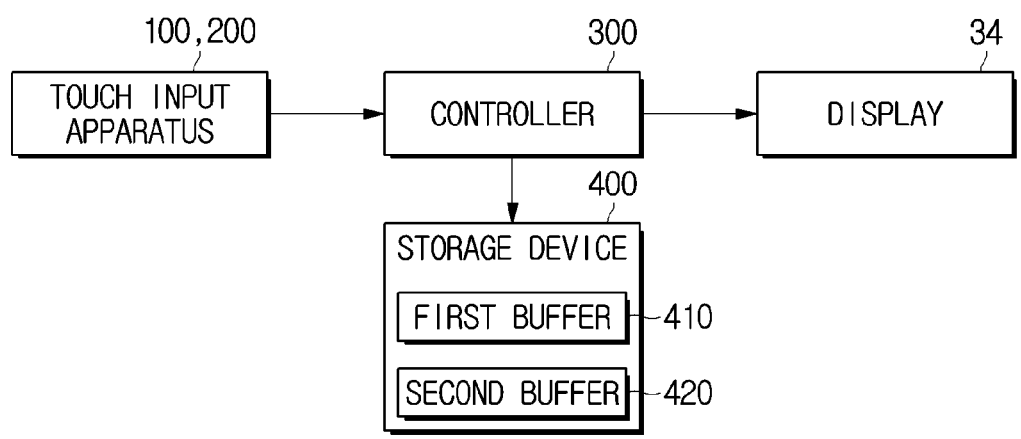
FIG. 3 is a control block diagram of a vehicle according to examplary implementations of the present disclosure.

FIG. 3 is a control block diagram of a vehicle according to exemplary implementations of the present disclosure.

A vehicle according to an implementation of the present disclosure may include: the touch input apparatus 100 or 200 configured to sense a sub gesture through a touch portion; a storage device 400 configured to store various information; the display 34 configured to display a character input interface; and a controller 300 configured to determine whether a gesture consisting of one or more sub gestures corresponds to a control command or a character input command according to predetermined delay time, and to control the character input interface according to the result of the determination.

The storage device 400 may store various information directly or indirectly related to the vehicle 1 in advance. For example, the storage device 400 may store direct information, such as map information, navigation information of the vehicle 1, state information of the vehicle 1, etc., and indirect information, such as multimedia information including images and moving images received from an internal device of the vehicle 1 or from an external device, in advance.

Also, the storage device 400 may store the relation between a gesture sensed by the touch input apparatus 100 or 200 (will be described later) and a control command, in advance, and also may store a user interface that is displayed on the display 34 (which will be described below) in advance.

The storage device 400 may store the corresponding relation between characters and character input gestures among gestures consisting of one or more sensed sub gestures, in advance.

In addition, the storage device 400 may store locations (referred to as sub gesture sensing locations) at which the touch input apparatus 100 or 200 senses sub gestures, according to time at which the touch input apparatus 100 or 200 senses the sub gestures.

More specifically, the storage device 400 may include: a first buffer 410 to accumulate sub gesture sensing locations sequentially, and to store the accumulated sub gesture sensing locations; and a second buffer 420 to store control commands corresponding to the individual sub gestures. The first buffer 410 and the second buffer 420 will be described below.

The information stored in the storage device 400 may be provided to the controller 300 to be used for the control of the vehicle 1.

The display 34 may provide the character input interface to enable a user including a driver and a passenger to easily input characters. In order to provide the user with an environment of enabling the user to input characters, the character input interface may include various objects, which will be described below.

The touch input apparatus 100 or 200 may sense a touch made by a passenger including a driver. The touch input apparatus 100 or 200 can be implemented in various ways within a technical concept for sensing touches. For example, the touch input apparatus 100 or 200 may be provided in the shape of a surface capable of sensing a touch, or in the shape of a circle or oval.

Also, the touch input apparatus 100 or 200 according to implementations of the present disclosure may include a concave area that is depressed toward the center, and may sense a touch on the concave area.

Figure 4A:
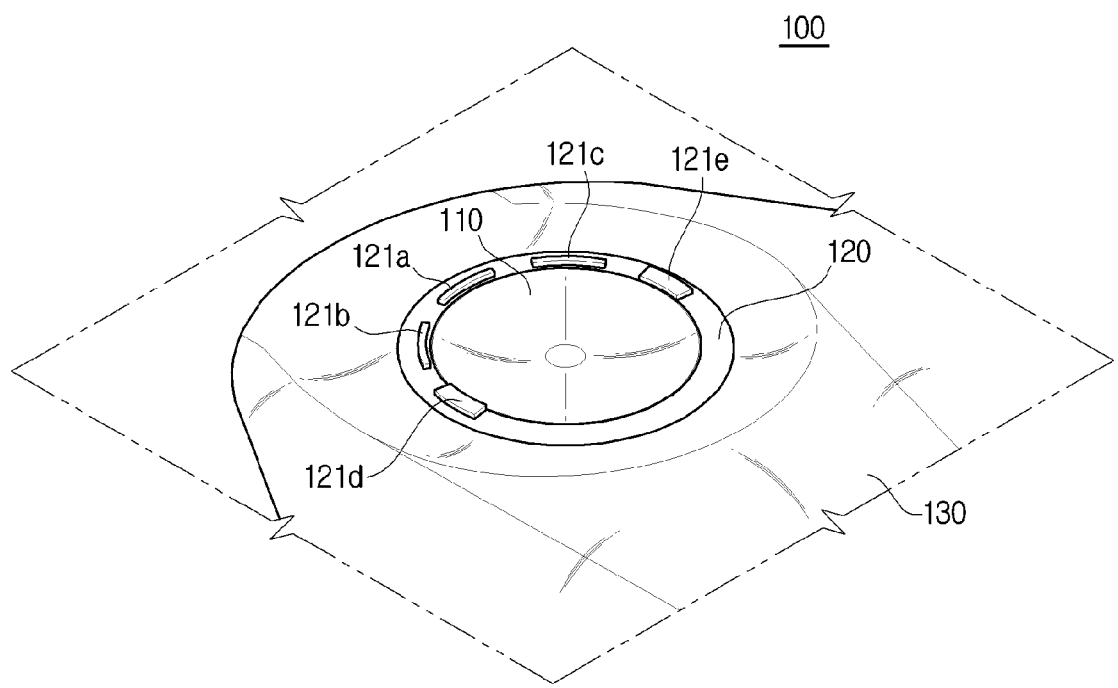
FIGS. 4A, 4B and 4C are views for describing a touch input apparatus according to exemplary implementations of the present disclosure.
Figure 4B:
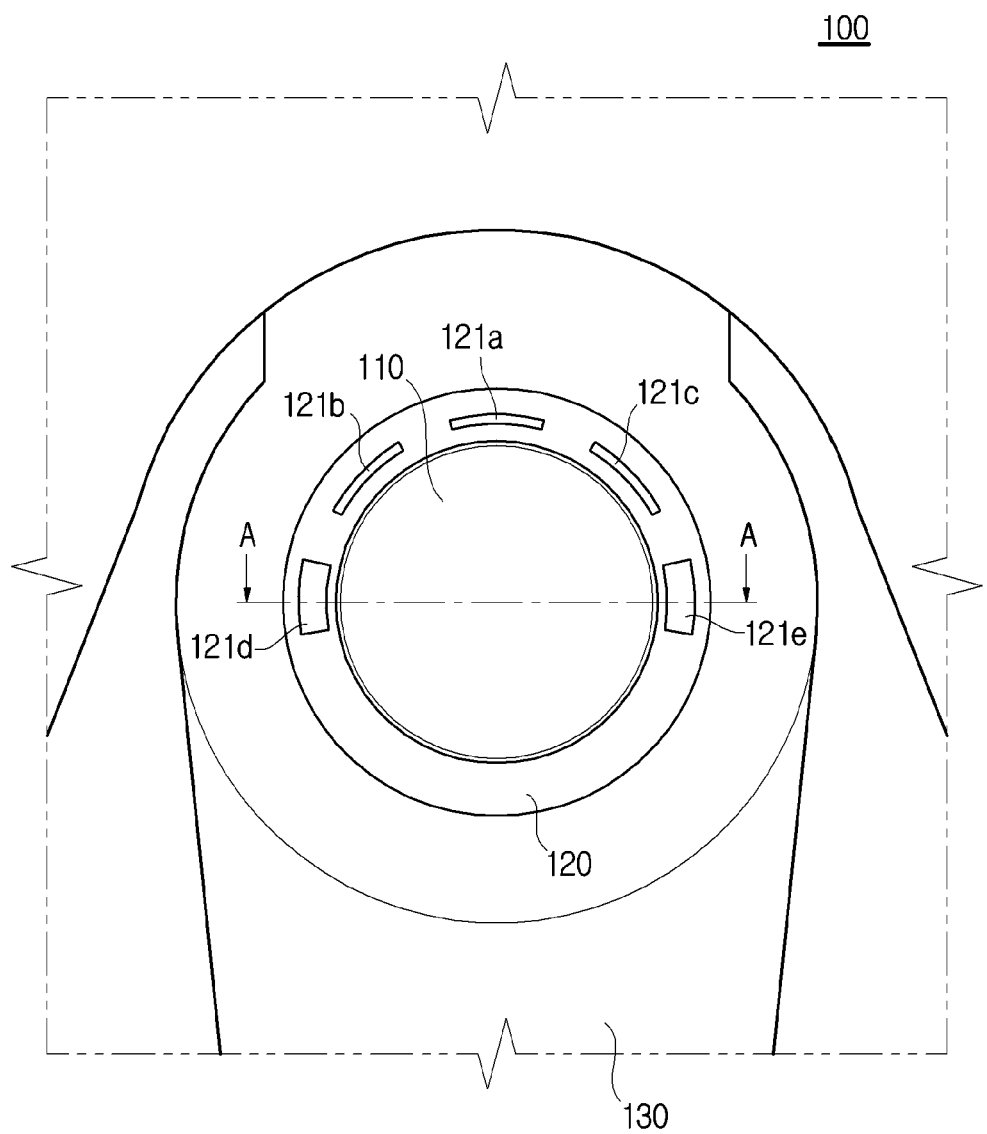
Figure 4C:
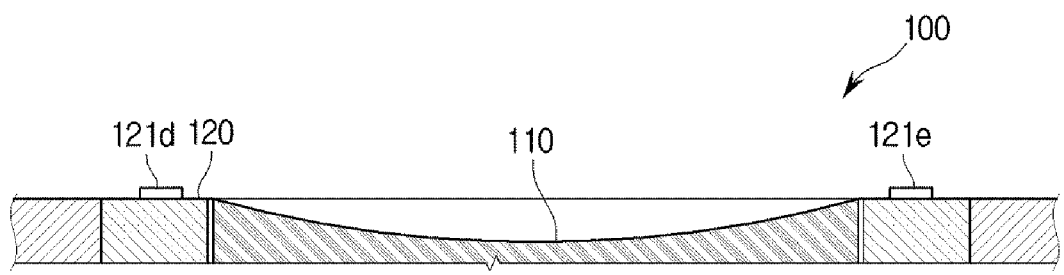
Figure 5A:
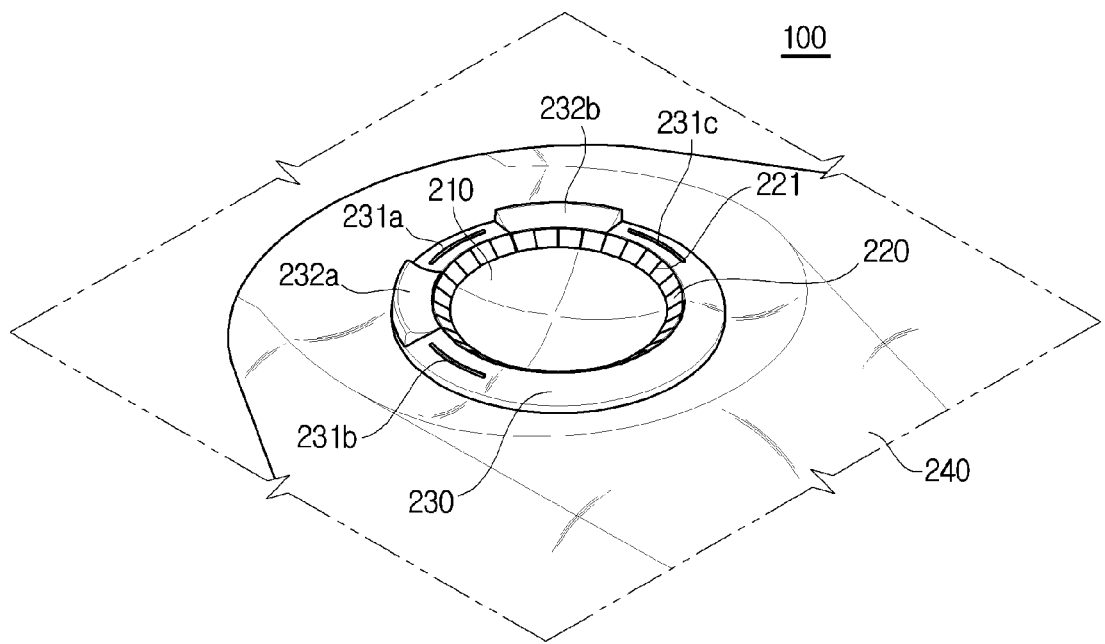
FIGS. 5A, 5B, and 5C are views for describing a touch input apparatus according to exemplary implementations of the present disclosure.
Figure 5B:
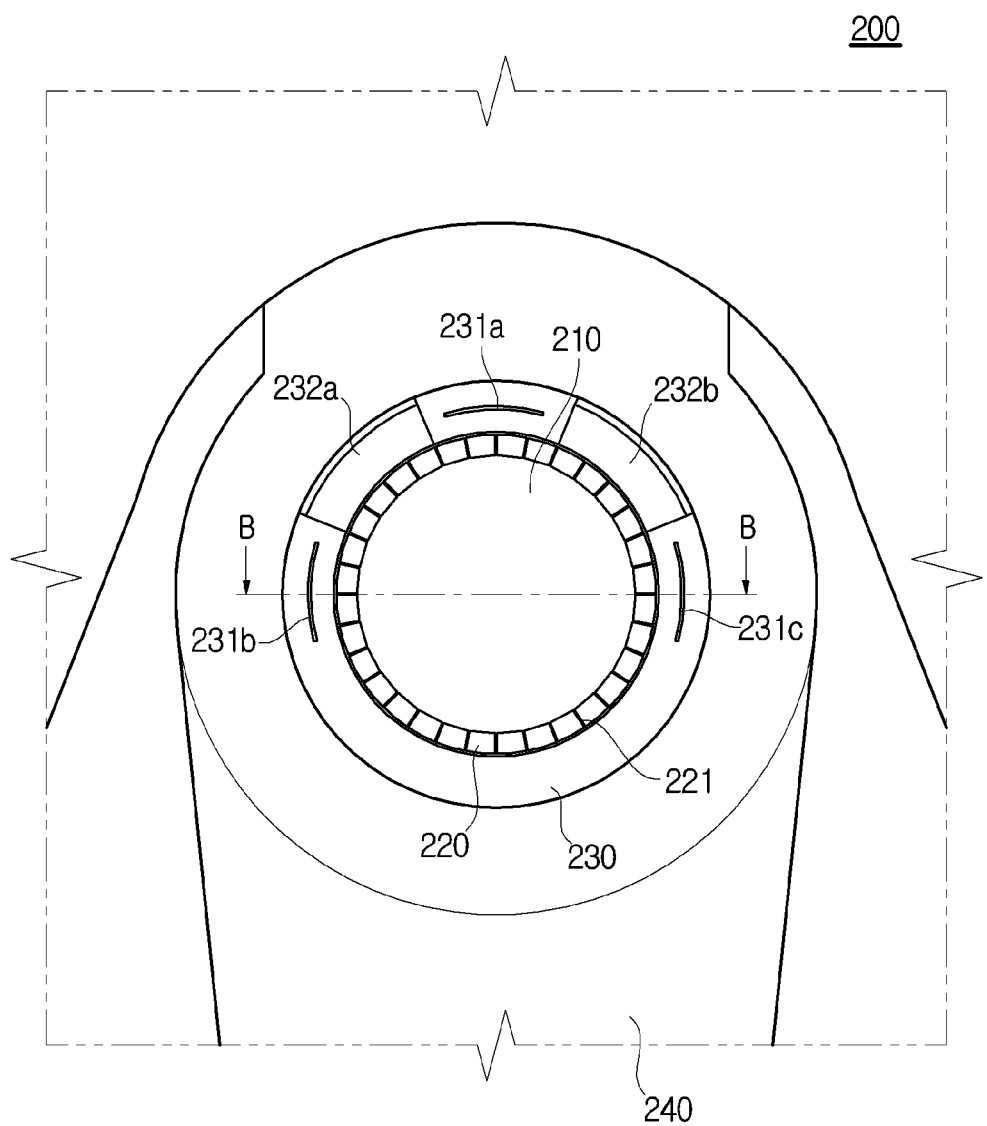
Figure 5C:
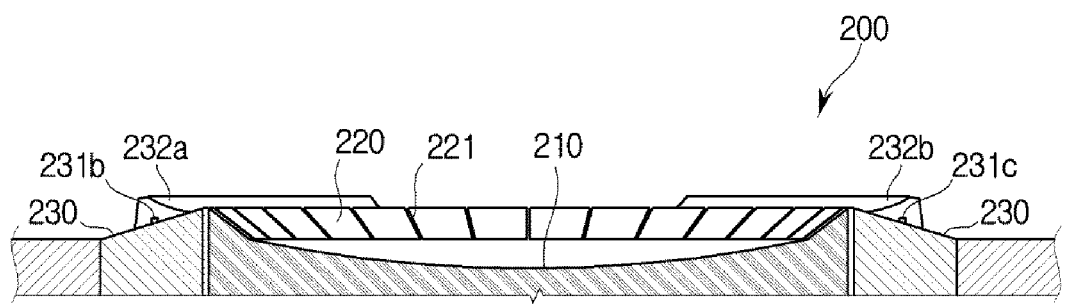

FIGS. 4A, 4B, and 4C are views for describing a touch input apparatus according to exemplary implementations of the present disclosure, and FIGS. 5A, 5B, and 5C are views for describing a touch input apparatus according to exemplary implementations of the present disclosure.

FIG. 4A is a perspective view of a touch input apparatus according to exemplary implementations of the present disclosure, FIG. 4B is a top view of a touch input apparatus according to exemplary implementations of the present disclosure, and FIG. 4C is a cross-sectional view of a touch input apparatus according to exemplary implementations of the present disclosure, taken along a line A-A of FIG. 4B.

A touch input apparatus 100 shown in FIGS. 4A, 4B, and 4C may include a touch portion 110 configured to sense a passenger's touch, and a border portion 120 surrounding the touch portion 110.

The touch portion 110 may be a touch pad to which a signal is input when a passenger contacts or approaches the touch pad with his/her finger or a pointer such as a touch pen. The passenger may input a desired control command by making a predetermined touch gesture on the touch portion 110.

The touch pad may be a touch film or a touch sheet including a touch sensor, regardless of its name. Also, the touch pad may be a touch panel which is a display capable of detecting touch operation made on a screen.

Meanwhile, a touch operation of making a pointer approach a touch pad so as for the pointer to be at the proximity of the touch pad without being in contact with the touch pad in order to recognize the location of the pointer is called "proximity touch," and a touch operation of making a pointer contact a touch pad in order to recognize the location of the pointer is called "contact touch". The location of a pointer at which proximity touch is recognized may be a location at which the pointer approaches a touch pad to be vertical to the touch pad.

The touch pad may be a resistive type touch pad, an optical type touch pad, a capacitive type touch pad, an ultrasonic type touch pad, or a pressure type touch pad. That is, the touch pad may be any one of various kinds of touch pads well-known in the art.

The border portion 120 may be an area surrounding the touch portion 110, and may be provided as a separate member from the touch portion 110. In the border portion 120, one or more key buttons or touch buttons 121 may be arranged in such a way to surround the touch portion 110. Accordingly, the passenger may input a control command by touching the touch portion 110 or using the buttons 121 arranged in the border portion 120 around the touch portion 110.

The touch input apparatus 100 may further include a wrist supporting portion 130 to support the passenger's wrist. The wrist supporting portion 130 may be positioned higher than the touch portion 110. Since the wrist supporting part 130 is positioned higher than the touch portion 110, the wrist supporting portion 130 may prevent the passenger's wrist from being bent, when he/she touches the touch portion 110 with his/her finger while putting his/her wrist on the wrist supporting portion 130. Accordingly, the wrist supporting portion 130 may protect the passenger from musculoskeletal system disorders, while offering a positive operation feeling.

The touch portion 110 may include an area that is lower than the boundary line with the border portion 120. That is, the touch surface of the touch portion 110 may be lower than the boundary line with the border portion 120. For example, the touch surface of the touch portion 110 may be inclined downward from the boundary line with the border portion 120, or the touch surface of the touch portion 110 may have a step with respect to the boundary line with the border portion 120. For example, as shown in FIG. 4C, the touch portion 110 may include a concave, curved area.

Since the touch portion 110 includes an area lower than the boundary line with the border portion 120, the passenger can recognize the area of the touch portion 110 and the boundary line with his/her tactile impression. In the touch input apparatus 100, the center area of the touch portion 110 may have a high detection rate with respect to touch operations. Also, when the passenger inputs a touch operation, the passenger can intuitively recognize the touch area and the boundary line with his/her tactile impression so that he/she can apply the touch operation to an exact location, resulting in an improvement in accuracy of touch inputs.

The touch portion 110 may include a concave area, as described above. Herein, the term "concave" means a hollow or depressed shape, and may also include an inclined or stepped shape, as well as a round depressed shape.

Referring to FIG. 4C, the touch portion 110 may include a concave, curved surface. In this case, the concave, curved surface of the touch portion 110 may have different curvatures according to area. For example, the center area of the concave, curved surface may have a relatively small curvature (a large radius of curvature), and the outer area of the concave, curved surface may have a relatively large curvature (a small radius of curvature).

Since the touch portion 110 includes a curved surface, the passenger can feel improved touch sensation (or operation feeling) when applying a touch input to the touch portion 110. The curved surface of the touch portion 110 may similarly correspond to a trajectory drawn by a user fingertip's movement occurring when he/she moves his/her finger while fixing his/her wrist or when he/she rotates or twists his/her wrist while spreading out his/her fingers.

Also, the touch portion 110 may have a circular shape. If the touch portion 110 has a circular shape, it may be easy to form a concave, curved area in the touch portion 110. Also, if the touch portion 110 has a circular shape, the passenger can easily recognize the touch area of the touch portion 100 with his/her tactile feeling so as to easily input rolling or spin operations.

Also, since the touch portion 110 is curved, the passenger can intuitively recognize at which location of the touch portion 110 his/her finger is positioned. Also, if the touch portion 110 is curved, all points of the touch portion 110 may have different gradients. Accordingly, the passenger can intuitively recognize which location of the touch portion 110 his/her finger touches, through a sense of gradient felt by the finger. That is, the curved shape of the touch portion 110 can provide the passenger with a feedback about which location of the touch portion 110 his/her finger is located at, when he/she makes a gesture on the touch portion 110 although fixing his/her eyes at some other place instead of the touch portion 110, thereby helping the passenger make his/her desired gesture and improving the accuracy of gesture inputs.

However, unlike the implementation shown in FIGS. 4A to 4C, the concave area of a touch input apparatus according to some implementations shown in FIGS. 5A to 5C may be divided into two areas of a center area and an outer area.

FIG. 5A is a perspective view of a touch input apparatus according to exemplary implementations of the present disclosure, FIG. 5B is a top view of a touch input apparatus according to exemplary implementations of the present disclosure, and FIG. 5C is a cross-sectional view of a touch input apparatus according to exemplary implementations of the present disclosure, taken along a line B-B of FIG. 5B.

Referring to FIGS. 5A, 5B, and 5C, a touch input apparatus 200 may include touch portions 210 and 220 to detect a passenger's touch input, and a border portion 230 surrounding the touch portions 210 and 220.

A method in which the touch portions 210 and 220 detect a touch input may be the same as the method described above in the implementation of FIGS. 4A to 4C.

The border portion 230 surrounding the touch portions 210 and 220 may be provided as a separate member from the touch portions 210 and 220. In the border portion 230, one or more key buttons 232a and 232b or one or more touch buttons 231a, 231b, and 231c may be arranged in such a way to surround the touch portions 210 and 220. The passenger may input a gesture to the touch portions 210 and 220, or may input a signal using any one of the buttons 231a, 231b, 232a, 232b, and 232c arranged in the border portion 230 around the touch portions 210 and 220.

Also, as shown in FIGS. 5A to 5C, the touch input apparatus 200 may further include a wrist supporting portion 240 located below a gesture input portion and supporting the passenger's wrist.

Referring to FIG. 5C, the touch portions 210 and 220 may include an area that is lower than the boundary line with the border portion 230. That is, the touch surfaces of the touch portions 210 and 220 may be lower than the boundary line with the border portion 230. For example, the touch surfaces of the touch portions 210 and 220 may be inclined downward from the boundary line with the border portion 230, or the touch surfaces of the touch portions 210 and 220 may have a step with respect to the boundary line with the border portion 230. For example, as shown in FIG. 5C, the touch portions 210 and 220 may include a gesture input portion 210 including a concave, curved area.

The shape of the touch portions 210 and 220 having a concave area may be the same as that of the touch portion 110 described in the implementation of FIGS. 4A to 4C.

The touch portions 210 and 220 according to some implementations of the present disclosure may include a swiping input portion 220 inclined downward along the circumference of the gesture input portion 210. If the touch portions 210 and 220 have a circular shape, the gesture input portion 210 may be a part of a spherical surface, and the swiping input portion 220 may surround the circumference of the gesture input portion 210.

The swiping input portion 220 may detect a swiping gesture. For example, the passenger may input a swiping gesture along the swiping input portion 220 provided in the form of a circle. At this time, the passenger may input the swiping gesture in a clockwise or counterclockwise direction along the swiping input portion 220.

The swiping input unit 220 may include gradations 221. The gradations 221 may visually or tactilely inform the passenger of a relative location. For example, the gradations 221 may be embossed or engraved. The gradations 221 may be arranged at regular intervals. Accordingly, the passenger can intuitively recognize the number of gradations through which his/her finger passes while making a swiping operation so as to accurately adjust the length of the swiping gesture.

According to an exemplary implementation, a cursor that is displayed on the display 34 (see FIG. 2) may move according to the number of gradations 221 through which a finger passes when a swiping gesture is made. If the passenger makes a swiping gesture when various selected characters are successively displayed on the display 34, a selected character may move to the next one whenever the passenger's finger passes through a gradation 221.

The gradient of the swiping input portion 220 shown in FIGS. 5A, 5B, and 5C may be greater than the gradient in the direction of tangent of the swiping input portion 220 with respect to the boundary line between the swiping input portion 220 and the gesture input portion 210. Since the swiping input portion 220 is more steeply inclined than the gesture input portion 210, the passenger can intuitively recognize the gesture input portion 210 when inputting a gesture to the gesture input portion 210. Meanwhile, while a gesture is input to the gesture input portion 210, no touch input applied on the swiping input portion 220 may be recognized. Accordingly, when the passenger inputs a gesture to the gesture input portion 210 until reaching the boundary line with the swiping input portion 220, the gesture input applied on the gesture input portion 210 may not overlap with any swiping gesture input applied on the swiping input portion 220.

Meanwhile, the swiping input portion 220 may be integrated into the gesture input portion 210. Also, a plurality of touch sensors may be respectively installed in the gesture input portion 210 and the swiping input portion 220, or a touch sensor may be installed in the gesture input portion 210 and the swiping input portion 220. If the gesture input portion 210 and the swiping input portion 220 include a touch sensor, the controller 300 may distinguish the touch area of the gesture input portion 210 from the touch area of the swiping input portion 220 to distinguish a signal generated in correspondence to a touch input applied on the gesture input portion 210 from a signal generated in correspondence to a touch input applied on the swiping input portion 220.

The touch input apparatus 200 may further include one or more buttons 231 and 232, as described above. The buttons 231 and 232 may be arranged around the touch portions 210 and 220. The buttons 231 and 232 may include one or more touch buttons 231a, 231b, and 231c for performing a predetermined function according to the passenger's touch input, and one or more pressure buttons 232a and 232b for change its, or a, position according to pressure applied by the passenger to perform a predetermined function.

Referring again to FIG. 3, the controller 300 may control the character input interface according to a control command or a character input command corresponding to a gesture consisting of one or more sensed sub gestures. Herein, each sub gesture may mean a gesture made by a single continuous touch operation.

If the user inputs a gesture as a control command, the controller 300 may search a control command corresponding to the input gesture. The relation between gestures and control commands may have been stored in the storage device 400 in advance, and the controller 300 may search a control command corresponding to the input gesture, based on the relation between gestures and control commands stored in the storage device 400. An implementation for the relation between gestures and control commands stored in the storage device 400 may include "left-direction swipe gesture—delete", "right-direction swipe gesture—space", and "double-tap gesture—special function".

If the controller 300 finds, or receives, a control command, the controller 300 may control the character input interface according to the control command.

If the user inputs a gesture as a character input command, the controller 300 may search a character corresponding to the input gesture. The relation between gestures and characters may have been stored in the storage device 400 in advance, and the controller 300 may search a character corresponding to the input gesture, based on the relation between gestures and control commands stored in the storage device 400. If the controller 300 finds a character, the controller 300 may control the character input interface to display the character.

As such, the user may input a control command or a character input command to the character input interface, as necessary. However, if there is similarity between a gesture as a control command and a gesture as a character input command, a wrong recognition may occur in distinguishing between them.

When the user inputs a character input gesture for inputting a character "T", the touch input apparatus 200 may sense, as the character input gesture for the character "T", sub gestures consisting of a right-direction swipe gesture and a down-direction swipe gesture, sequentially.

Then, the controller 300 may store the right-direction sub gesture and the down-direction sub gesture, sequentially, in the storage device 400. As a result, the character input gesture consisting of the right-direction sub gesture and the down-direction sub gesture may be stored in the storage space of the storage device 400. The controller 300 may search the character "T" corresponding to the gesture, stored in the storage device 400, and control the character input interface to display the character "T".

If the right-direction swipe gesture corresponds to a control command for spacing, there is a probability that the right-direction sub gesture will be wrongly recognized as the control command for spacing when the character input gesture is made. In this case, spacing, instead of inputting the character "T" on the character input interface, may be performed on the character input interface.

In order to overcome such a problem, the controller 300 may select any one of a control command input mode and a character input mode, and recognize a gesture input by the user according to the selected mode. However, in this case, since a user's input for selecting a mode is required, the user's operation load during driving may increase.

Accordingly, the controller 300 may need to distinguish between a control command and a character input command, without receiving a user's input for selecting a mode. In order to distinguish between a control command and a character input command, the controller 300 may set a first delay time period for determining a gesture as a control command, and a second delay time period for determining a gesture as a character input command. Herein, the delay time may be a time difference between time at which a gesture ends and time at which the gesture is determined, and the time at which the gesture ends may be set to time at which the finally sensed one of sub gestures configuring the gesture ends.

Particularly, the controller 300 may set the second delay time period for determining a gesture as a character input command to be longer than the first delay time period for determining a gesture as a control command.

Generally, a gesture as a control command may consist of a single sub gesture or a small number of sub gestures, and a gesture as a character input command may consist of a relatively larger number of sub gestures. Accordingly, the controller 300 may determine a gesture consisting of one or more sensed sub gestures as a control command after the first delay time period elapses. If there is no control command corresponding to the gesture, the controller 300 may determine the gesture as a character input command after the second delay time period that is longer than the first delay time period elapses. As a result, the controller 300 can distinguish between a gesture as a control command and a gesture as a character input command, without receiving a user's input for selecting a mode.

Meanwhile, if a sub gesture is newly sensed before the first delay time period elapses, the controller 300 may accumulate the newly sensed gesture in the previously configured gesture to reconfigure the gesture.

Meanwhile, according to the above-described method, when the same sub gestures are input successively within the first delay time period, the controller 300 may have difficulties in determining whether to recognize them as gestures for control commands or as gestures for inputting a character.

Hereinafter, methods for overcoming the problem will be described in detail with reference to FIGS. 6A to 6C and FIGS. 7A and 7B.

Figure 6A:
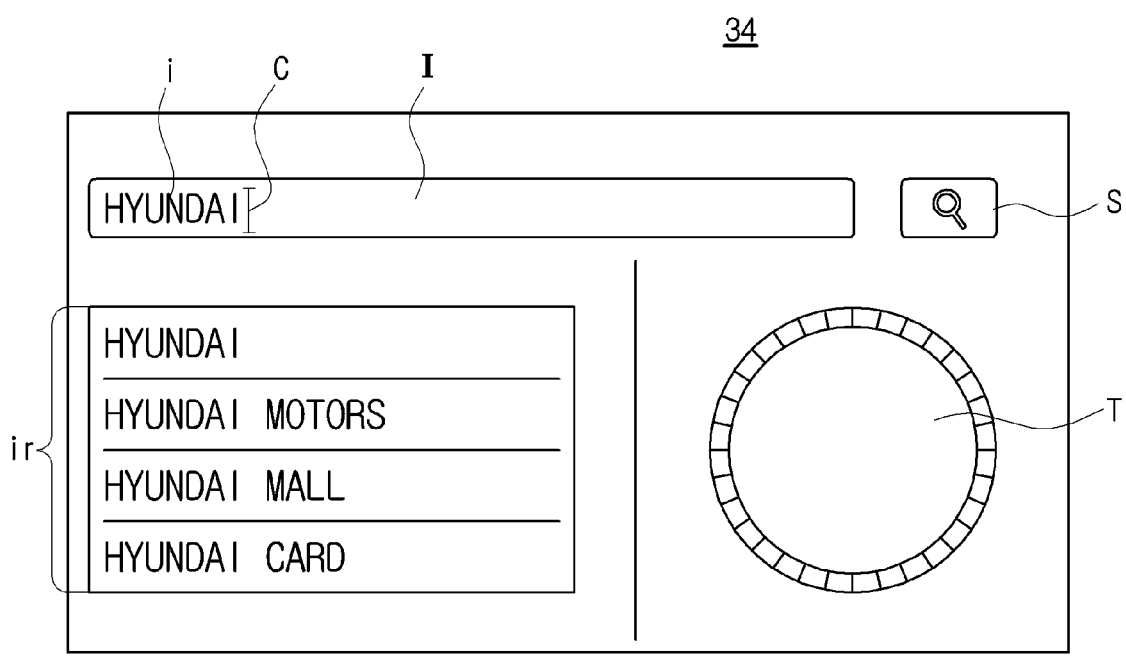
FIGS. 6A, 6B, and 6C are views for describing a case of controlling a character input interface according to a control command corresponding to a gesture according to exemplary implementations of the present disclosure.
Figure 6B:
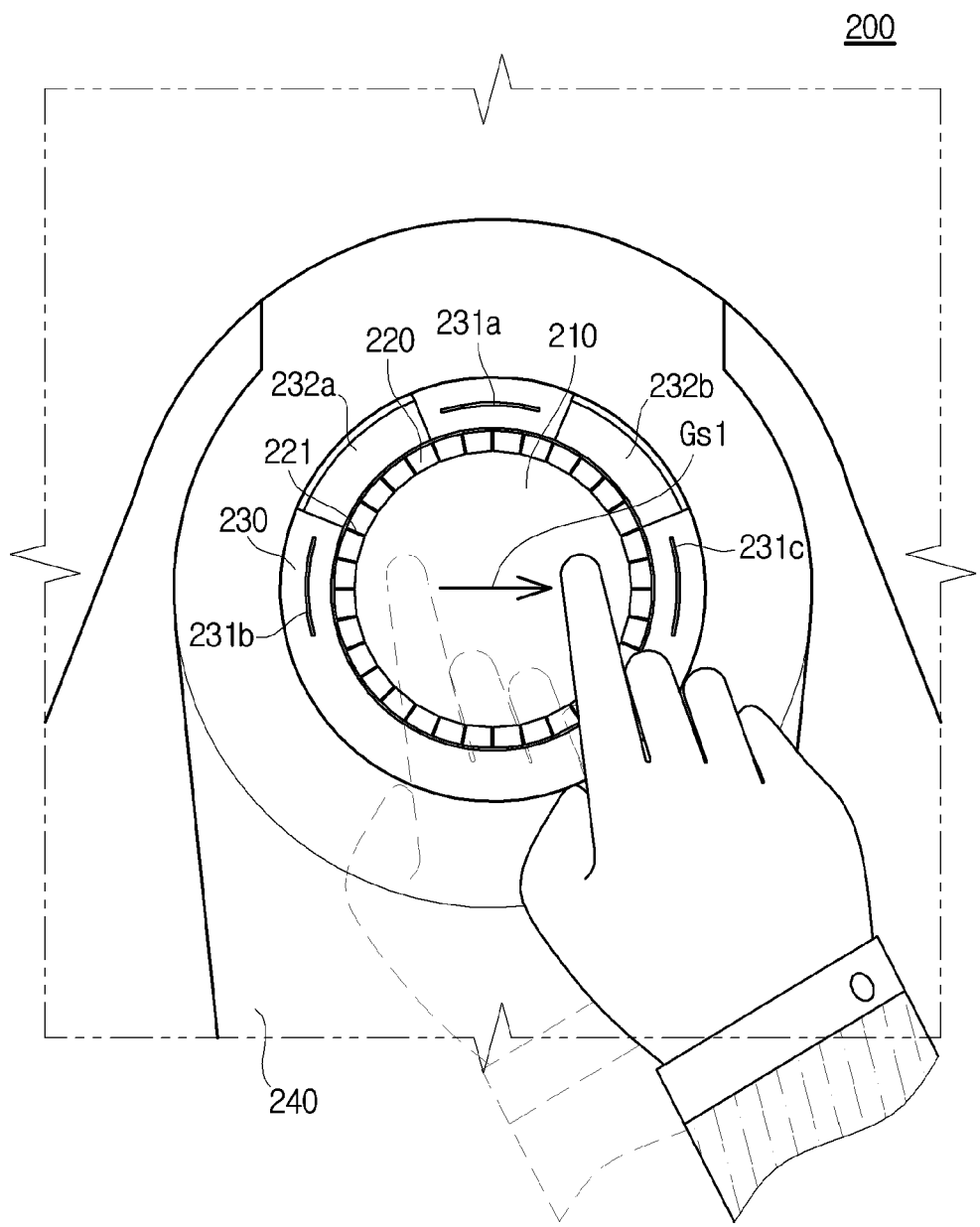
Figure 6C:
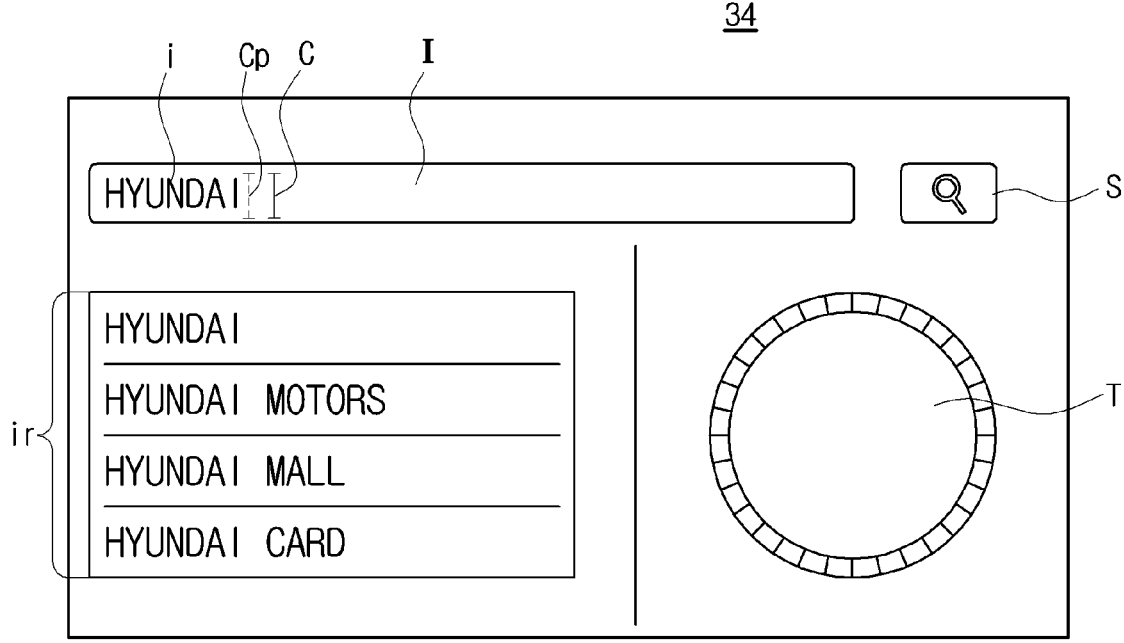
Figure 7A:
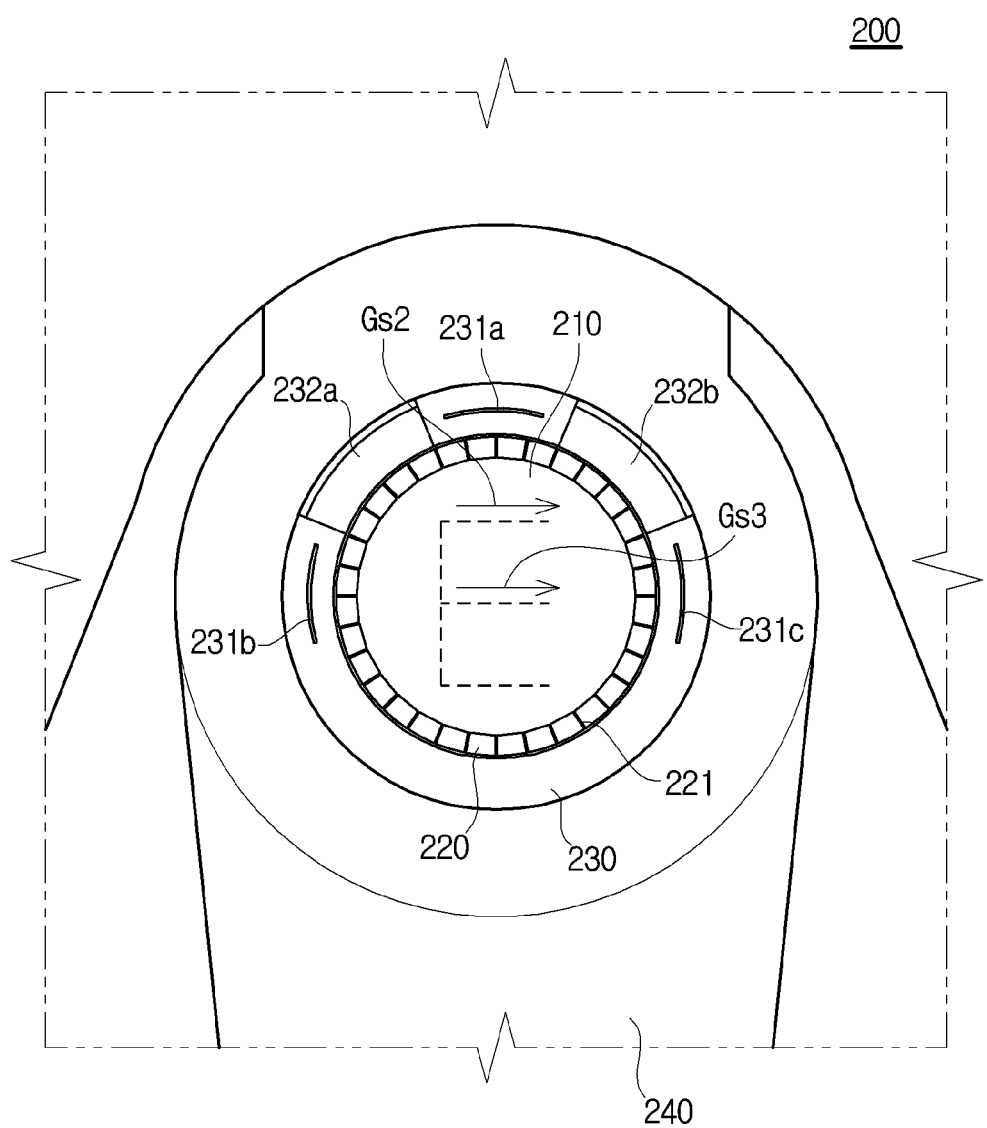
FIGS. 7A and 7B are views for describing a case of displaying a character corresponding to a gesture according to exemplary implementations of the present disclosure through a character input interface.
Figure 7B:
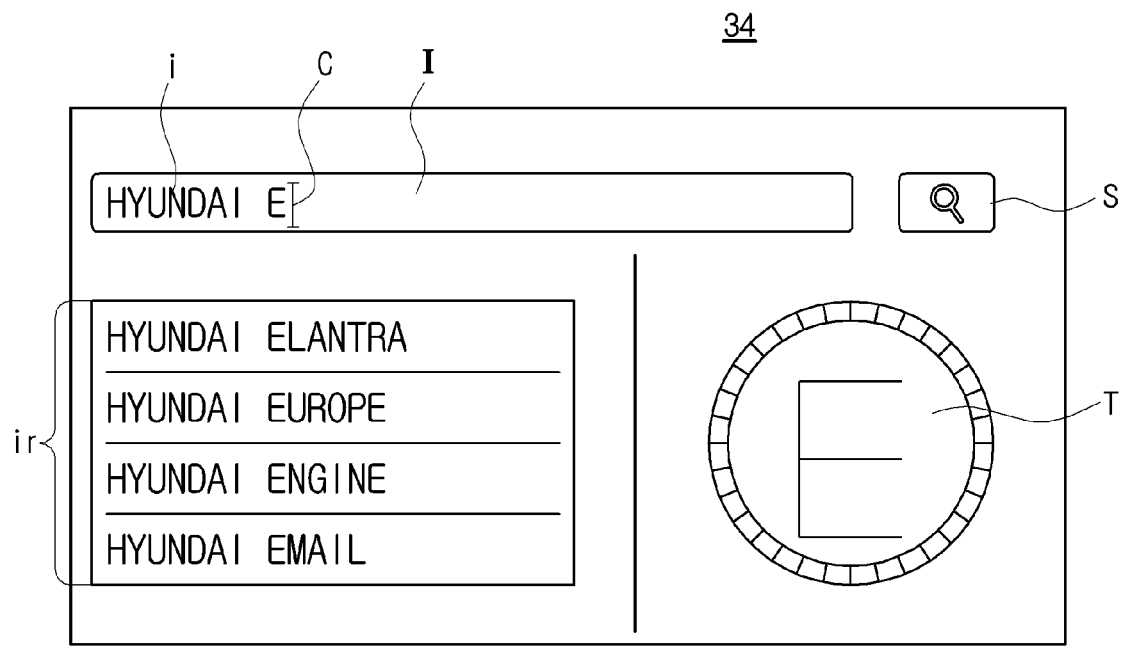

FIGS. 6A, 6B, and 6C are views for describing a case of controlling a character input interface according to a control command corresponding to a gesture according to exemplary implementations of the present disclosure, and FIGS. 7A and 7B are views for describing a case of displaying a character corresponding to a gesture according to exemplary implementations of the present disclosure through a character input interface.

Referring to FIG. 6A, the display 34 may display a character input interface that provides a user with an environment to enable the user to input a character. The character input interface may include a gesture display area T to visually display a character input gesture sensed by the touch input apparatus 100 or 200, an input character display area I to display a character (also, referred to as an input character) corresponding to the sensed character input gesture, a cursor C to guide a location at which the character corresponding to the sensed character input gesture is displayed, and a search icon S to search information associated with the input character. Also, the character input interface may further display a recommended character ir associated with the input character. FIG. 6A shows an implementation of the character input interface. That is, the character input interface may include a part of the above-described items, or may further include other items in addition to the above-described items.

In FIG. 6A, a case in which "HYUNDAI" is input as a character i through the character input interface, and "HYUNDAI", "HYUNDAI MOTORS", "HYUNDAI MALL", and "HYUNDAI CARD" are displayed as recommended characters ir associated with the character i is shown.

A newly input character may be located to the right of the cursor C, and then, the cursor C may move to the right of the newly input character.

If a user including a driver and a passenger wants to make a space, the user may input a gesture for spacing to the touch input apparatus 200. Referring to FIG. 6B, the user may input a right-direction swipe gesture Gs1 to the touch portions 210 and 220 of the touch input apparatus 200.

The touch portions 210 and 220 may sense the right-direction swipe gesture Gs1 as a sub gesture, and the controller 300 may store the right-direction swipe gesture Gs1 in the storage device 400. If no sub gesture is sensed within the first delay time period from time at which the right-direction swipe gesture Gs1 ends, the controller 300 may search a control command corresponding to a gesture consisting of the sub gesture Gs1, in the storage device 400.

If the right-direction swipe gesture Gs1 corresponds to a control command for spacing, the controller 300 may control the character input interface to perform spacing by moving the cursor C to the right by one space.

FIG. 6C shows the cursor C moved to the right by one space from the previous location Cp.

Meanwhile, when the user wants to input a character alphabet "E", the user may input a character input gesture for the alphabet "E" to the touch input apparatus 200. Dotted lines shown in FIG. 7A may represent a character input gesture for the alphabet "E".

The touch portions 210 and 220 may sense the character input gesture for the alphabet "E", and the controller 300 may store the character input gesture in the storage device 400. If no sub gesture is sensed within the second delay time period from a time at which the finally sensed one of sub gestures consisting of the character input gesture for the alphabet "E" ends, the controller 300 may control the character input interface to display the alphabet "E" corresponding to the stored character input gesture.

FIG. 7B shows the alphabet E newly displayed to the left of the cursor C.

The character input gesture for the alphabet "E" may include right-direction swipe gestures Gs2 and Gs3 that are sensed sequentially. The swipe gestures Gs2 and Gs3 may cause wrong recognition since they are similar to the swipe gesture Gs1 for spacing, and specifically, if the swipe gesture Gs1 is sensed a plurality of times sequentially within the first delay time period, the probability of wrong recognition may increase.

Each of gestures for inputting the alphabet "E" or Hangul consonants "ㅌ", "ㅍ", "ㅂ", etc. may include a plurality of swipe gestures to represent a plurality of strokes of the corresponding character, as sub gestures. However, since the swipe gesture is also used as a gesture for inputting a control command, it is necessary to determine whether a plurality of swipe gestures input within the first delay time period correspond to a plurality of control commands.

In order to make the determination, the controller 300 may compare the direction of a first sub gesture to the direction of a second sub gesture sensed within the first delay time period from a time at which the first sub gesture ends, and determine whether to recognize the first sub gesture and the second sub gesture as gestures for inputting a character, according to the result of the comparison.

More specifically, the controller 300 may compare a difference in direction between the first sub gesture and the second sub gesture to a reference direction difference. Herein, the reference direction difference may mean a minimum direction difference by which two directions can be recognized as different directions.

If the difference in direction between the first sub gesture and the second sub gesture is greater than or equal to the reference direction difference, this may mean that the direction of the first sub gesture is different from that of the second sub gesture. If the first sub gesture and the second sub gesture are swipe gestures, the controller 300 may determine the gesture including the first sub gesture and the second sub gesture, as a character input gesture, under the assumption that there is no case of sequentially inputting swipe gestures of different directions as control commands. As a result, the controller 300 may display a character corresponding to the character input gesture through the character input interface after the second delay time period elapses from time at which the final sub gesture of the character input gesture including the first sub gesture and the second sub gesture ends.

Meanwhile, if the difference in direction between the first sub gesture and the second sub gesture is smaller than the reference direction difference, there is a probability that each of the first sub gesture and the second sub gesture is a gesture for a control command although the second sub gesture has been sensed within the first delay time period.

In order to determine whether each of the first sub gesture and the second sub gesture is a gesture for a control command, the controller 300 may compare the start location of the first sub gesture to the start location of the second sub gesture. More specifically, the controller 300 may compare a difference between the start location of the first sub gesture and the start location of the second sub gesture to a reference start location difference. Herein, the reference start location difference may mean a minimum location difference by which two start locations can be recognized as different start locations.

If the difference between the start location of the first sub gesture and the start location of the second sub gesture is greater than or equal to the reference start location difference, this may mean that the start location of the first sub gesture is different from that of the second sub gesture. If the first sub gesture and the second sub gesture are swipe gestures, the controller 300 may determine the gesture including the first sub gesture and the second sub gesture, as a character input gesture, under the assumption that there is no case of sequentially inputting swipe gestures of the same direction, starting at different locations, as control commands. As a result, the controller 300 may display a character corresponding to the character input gesture through the character input interface after the second delay time period elapses from the time at which the final sub gesture of the character input gesture including the first sub gesture and the second sub gesture ends.

Meanwhile, if the difference between the start location of the first sub gesture and the start location of the second sub gesture is smaller than the reference start location difference, this may mean that the start location of the first sub gesture is identical to that of the second sub gesture. If the first sub gesture and the second sub gesture are swipe gestures, there is a case in which swipe gestures of the same direction, starting at the same location, are input sequentially as control commands (for example, a case in which spacing is performed a plurality of times or a case in which character deletion is performed a plurality of times), however, there is no case in which swipe gestures of the same direction, starting at the same location, are input sequentially as a character input command. Accordingly, the controller 300 may determine that the first sub gesture and the second sub gesture were input repeatedly as a gesture for the same control command. As a result, the controller 300 may control the character input interface sequentially according to control commands respectively corresponding to the first sub gesture and the second sub gesture.

Also, if the difference between the start location of the first sub gesture and the start location of the second sub gesture is smaller than the reference start location difference, the controller 300 may compare the speed of the first sub gesture to the speed of the second sub gesture to determine whether the first sub gesture and the second sub gesture are gestures for control commands. More specifically, the controller 300 may compare a difference in speed between the first sub gesture and the second sub gesture to a reference speed difference. Herein, the reference speed difference may mean a minimum speed difference by which two speeds can be recognized as different speeds.

If the difference in speed between the first sub gesture and the second sub gesture is smaller than the reference speed difference, this may mean that the speed of the first sub gesture is the same as the speed of the second sub gesture. If the first sub gesture and the second sub gesture are swipe gestures, there is a case of sequentially inputting swipe gestures of the same speed and the same direction, starting at the same location, as control commands (for example, a case in which spacing is performed a plurality of times or a case in which character deletion is performed a plurality of times), however, there is no case of sequentially inputting swipe gestures of the same speed and the same direction, starting at the same location, as a character input command. Accordingly, the controller 300 may determine that the first sub gesture and the second sub gesture were input repeatedly as a gesture for the same control command. As a result, the controller 300 may control the character input interface sequentially according to control commands respectively corresponding to the first sub gesture and the second sub gesture.

Also, when the difference between the start location of the first sub gesture and the start location of the second sub gesture is smaller than the reference start location difference, the controller 300 may compare the length of the first sub gesture to the length of the second sub gesture to determine whether the first sub gesture and the second sub gesture are gestures for control commands. More specifically, the controller 300 may compare a difference in length between the first sub gesture and the second sub gesture to a reference length difference. Herein, the reference length difference may mean a minimum length difference by which two lengths can be recognized as different lengths.

If the difference in length between the first sub gesture and the second sub gesture is smaller than the reference length difference, this may mean that the length of the first sub gesture is the same as that of the second sub gesture. If the first sub gesture and the second sub gesture are swipe gestures, there is a case of sequentially inputting swipe gestures of the same speed, the same length, and the same direction, starting at the same location, as control commands (for example, a case in which spacing is performed a plurality of times or a case in which character deletion is performed a plurality of times), however, there is no case of sequentially inputting swipe gestures of the same speed, the same length, and the same direction, starting at the same location, as a character input command. Accordingly, the controller 300 may determine that the first sub gesture and the second sub gesture were input repeatedly as a gesture for the same control command. As a result, the controller 300 may control the character input interface sequentially according to control commands respectively corresponding to the first sub gesture and the second sub gesture.

At this time, the controller 300 may control the character input interface according to a control command corresponding to the first sub gesture that is first sensed, and then control, if no gesture is sensed within the first delay time period from the time at which the second sub gesture ends, the character input interface according to a control command corresponding to the second sub gesture just after the first delay time period elapses. In contrast, if a third sub gesture is sensed within the first delay time period from the time at which the second sub gesture ends, the controller 300 may control the character input interface according to the control command corresponding to the second sub gesture when the third sub gesture is sensed.

Meanwhile, if there is no control command corresponding to at least one of the first sub gesture and the second sub gesture, the controller 300 may determine the gesture including the first sub gesture and the second sub gesture as a character input gesture. Since a sub gesture having no corresponding control command cannot configure a gesture for a control command, the controller 300 may determine the gesture including the first sub gesture and the second sub gesture as a character input gesture, and display a character corresponding to the character input gesture through the character input interface.

For the operation, the controller 300 may use the second buffer 420. As described above, the second buffer 420 may store a control command corresponding to a sensed sub gesture, regardless of whether or not the first delay time period elapses. Accordingly, if a sub gesture corresponds to none of control commands stored in the second buffer 420, the controller 300 may determine a gesture including the corresponding sub gesture as a character input gesture, and perform an operation according to a character input command.

Even when the touch portions 210 and 220 sense a fourth sub gesture, and a control command corresponding to the fourth sub gesture is stored in the second buffer 420, the controller 300 may not control the character input interface according to a control command corresponding to the fourth sub gesture although the first delay time period elapses. The reason is because if the fourth sub gesture is a right-direction swipe gesture, the fourth sub gesture may be a sub gesture as a stroke of a character input gesture (for example, a character input gesture for alphabet "T") including the right-direction swipe gesture as a sub gesture. Accordingly, when no sub gesture is sensed within the second delay time period from time at which the fourth sub gesture ends, the controller 300 may control the character input interface according to the control command corresponding to the fourth sub gesture.

If a sub gesture is newly sensed within the first delay time period from the time at which the fourth sub gesture ends, the controller 300 may determine whether the fourth sub gesture is a gesture for a control command, according to the above-described method. Also, if a sub gesture is newly sensed within the second delay time period after the first delay time period elapses from the time at which the fourth sub gesture ends, the controller 300 may determine the gesture including the fourth sub gesture as a character input gesture, and perform the following, or corresponding, operation.

Figure 8:
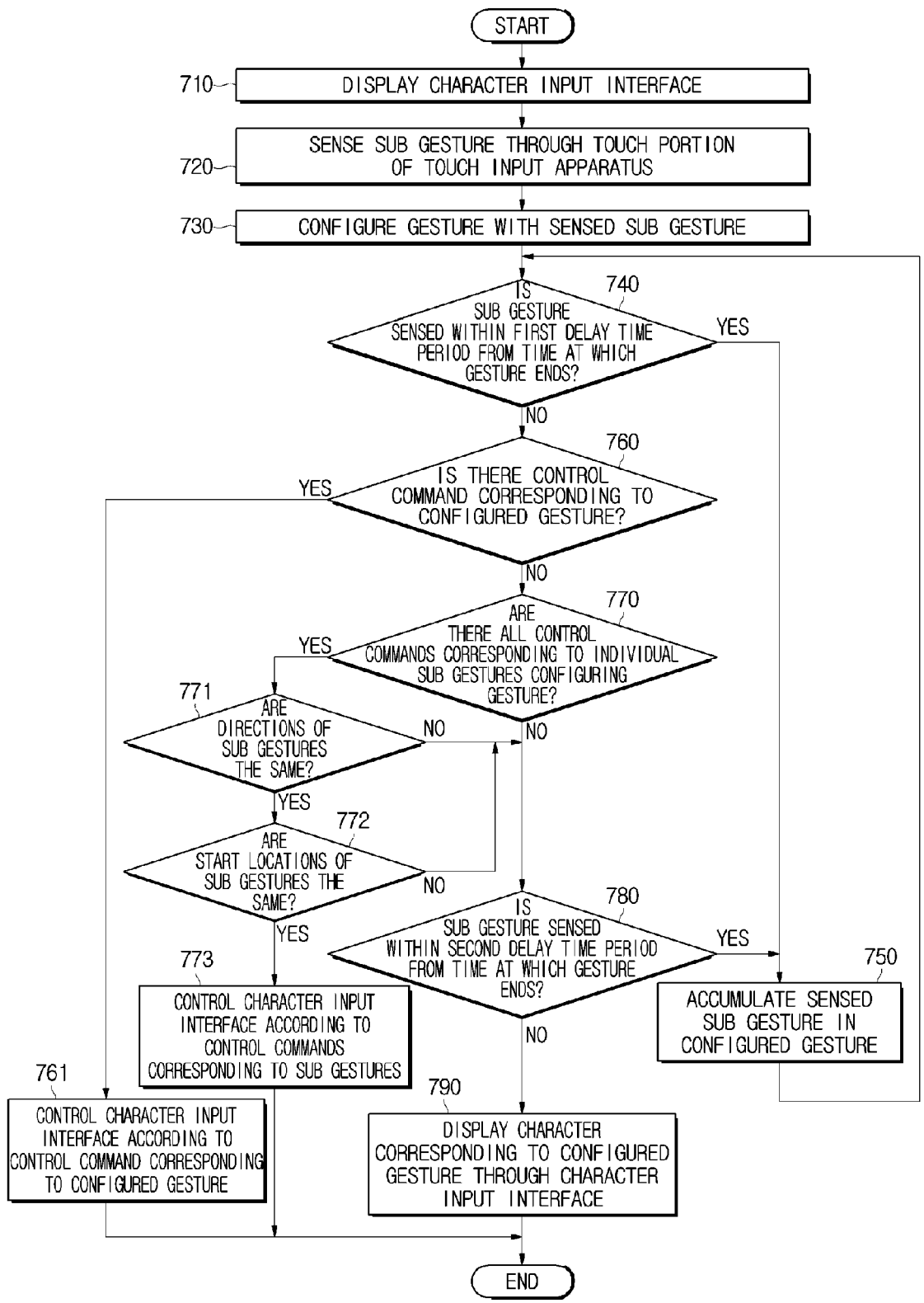
FIG. 8 is a flowchart illustrating a vehicle control method according to exemplary implementations of the present disclosure.

FIG. 8 is a flowchart illustrating a vehicle control method according to exemplary implementations of the present disclosure.

First, the vehicle 1 may display a character input interface on the display 34, in operation 710.

Then, the vehicle 1 may sense a sub gesture through the touch portion 210 of the touch input apparatus 200, in operation 720. Herein, the sub gesture may be a group of sequential touches extending from a start point to an end point.

If a sub gesture is sensed, the vehicle 1 may configure a gesture with the sensed sub gesture, in operation 730. More specifically, the controller 300 of the vehicle 1 may store a location at which the sub gesture is sensed, according to time, in storage space for gestures of the storage device 400.

Then, the vehicle 1 may determine whether a sub gesture is newly sensed within a first delay time period from a time when the configured gesture ends, in operation 740. The time at which the gesture ends may mean time at which the finally sensed one of at least one sub gesture configuring the gesture ends.

If a sub gesture is newly sensed within the first delay time period, the vehicle 1 may accumulate the newly sensed sub gesture in the previously configured gesture, in operation 750. More specifically, the controller 300 of the vehicle 1 may store a location at which the newly sensed sub gesture is sensed, according to time, in the storage space in which the previously sensed sub gesture is stored. If the operation of accumulating the sub gestures is complete, the vehicle 1 may determine whether a sub gesture is newly sensed within the first delay time period from time at which the gesture ends.

In contrast, if no sub gesture is sensed within the first delay time period, the vehicle 1 may determine whether there is a control command corresponding to the configured gesture, in operation 760. Since the relation between gestures and control commands is stored as a table in the controller 300 of the vehicle 1, the vehicle 1 may search a control command corresponding to the configured gesture with reference to the stored table.

If the vehicle 1 determines that there is a control command corresponding to the configured gesture, the vehicle 1 may control the character input interface according to the control command, in operation 761, and terminate the process.

In contrast, if the vehicle 1 determines that there is no control command corresponding to the configured gesture, the vehicle 1 may determine whether there are all control commands corresponding to the individual sub gestures configuring the gesture, in operation 770.

If the vehicle 1 determines that there are all control commands corresponding to the individual sub gestures configuring the gesture, the vehicle 1 may determine whether the directions of the sub gestures are the same, in operation 771. If the vehicle 1 determines that the directions of the sub gestures are the same, the vehicle 1 may determine whether the start locations of the sub gestures are the same, in operation 772.

As a result, if the vehicle 1 determines that there are all control commands corresponding to the individual sub gestures, that the directions of the sub gestures are the same, and that the start locations of the sub gestures are the same, the vehicle 1 may control the character input interface sequentially according to the control commands corresponding to the individual sub gestures, in operation 773.

In contrast, if the vehicle 1 determines that there is no control command corresponding to at least one sub gesture, that the directions of the sub gestures are different from each other, or that the start locations of the sub gestures are different from each other, the vehicle 1 may determine the gesture consisting of the sub gestures as a character input gesture. As a result, the vehicle 1 may determine whether a sub gesture is newly sensed within a second delay time period from time at which the gesture ends, in operation 780. If the vehicle 1 determines that a sub gesture is newly sensed, the vehicle 1 may accumulate the newly sensed sub gesture in the previously configured gesture, in operation 750, and determine whether a sub gesture is newly sensed within the first delay time period, in operation 740.

If the vehicle 1 determines that no sub gesture is sensed within the second delay time period, the vehicle 1 may display a character corresponding to the configured gesture through the character input interface, in operation 790.

According to the vehicles and the control methods thereof as described above, it is possible to lower the generation probability of a wrong recognition in distinguishing a gesture for controlling the character input interface from a character input gesture. Accordingly, it is possible to provide a user with an environment of enabling him/her to easily input characters, thereby improving the user's convenience in inputting characters.

Although some implementations of the present disclosure have been shown and described, it would be appreciated by those skilled in the art that changes may be made in these implementations without departing from the principles and spirit of the disclosure, the scope of which is defined in the claims and their equivalents.

What is claimed is:

1. A vehicle, comprising:
   a display configured to provide one character input interface;
   a touch input apparatus including a touch pad and configured to sense a plurality of sub gestures sequentially through the touch pad;
   a hardware controller configured to:
      determine whether to display a character or to execute control commands according to a direction, a start location, and a time difference among the sensed plurality of sub gestures, and
      display a character corresponding to a gesture including a first sub gesture and a second sub gesture on the one character input interface, when a difference between a direction of the first sub gesture of the plurality of sensed sub gestures and a direction of the second sub gesture sensed within a first delay time period starting at a time at which the first sub gesture ends is greater than or equal to a reference direction difference; and
   a storage device including a first buffer configured to store the plurality of sensed sub gestures sequentially, and a second buffer configured to store a plurality of control commands corresponding to the plurality of sensed sub gestures simultaneously,
   wherein upon a determination that the difference between the direction of the first sub gesture and the direction of the second sub gesture is smaller than the reference direction difference, and upon a determination that a difference between a start location of the first sub gesture and a start location of the second sub gesture is greater than or equal to a reference start location difference, the hardware controller controls the character input interface to display the character corresponding to the gesture including the first sub gesture and the second sub gesture, and wherein upon the determination that the difference between the direction of the first sub gesture and the direction of the second sub gesture is smaller than the reference direction difference, and upon a determination that the difference between the start location of the first sub gesture and the start location of the second sub gesture is smaller than the reference start location difference, the hardware controller controls the character input interface sequentially according to control commands respectively corresponding to the first sub gesture and the second sub gesture.

2. The vehicle according to claim 1, wherein upon the determination that the difference between the start location of the first sub gesture and the start location of the second sub gesture is smaller than the reference start location difference, and upon a determination that a difference between a speed of the first sub gesture and a speed of the second sub gesture is smaller than a reference speed difference, the hardware controller controls the one character input interface sequentially according to the control commands respectively corresponding to the first sub gesture and the second sub gesture.

3. The vehicle according to claim 1, wherein upon the determination that the difference between the start location of the first sub gesture and the start location of the second sub gesture is smaller than the reference start location difference, and upon a determination that a difference between a length of the first sub gesture and a length of the second sub gesture is smaller than a reference length difference, the hardware controller controls the one character input interface sequentially according to the control commands respectively corresponding to the first sub gesture and the second sub gesture.

4. The vehicle according to claim 1, wherein the hardware controller controls the one character input interface according to a control command corresponding to the first sub gesture, and then controls the one character input interface according to a control command corresponding to the second sub gesture when a third sub gesture is sensed within the first delay time period from a time at which the first sub gesture ends, or after the first delay time period elapses from the time at which the first sub gesture ends.

5. The vehicle according to claim 1, wherein upon a determination that there is no control command corresponding to at least one of the first sub gesture and the second sub gesture, the hardware controller controls the one character input interface to display the character corresponding to the gesture including the first sub gesture and the second sub gesture.

6. The vehicle according to claim 1, wherein the hardware controller controls the one character input interface to display the character corresponding to the gesture including the first sub gesture and the second sub gesture after a second delay time period elapses from a time at which the gesture ends, wherein the second delay time period is longer than the first delay time period.

7. The vehicle according to claim 6, wherein upon a determination that no sub gesture is sensed within the second delay time period from a time at which a fourth sub gesture of the plurality of sensed sub gestures ends, the hardware controller controls the one character input interface according to a control command corresponding to the fourth sub gesture.

8. A method of controlling a vehicle, comprising:
providing one character input interface;
sensing a plurality of sub gestures sequentially through a touch input apparatus of the vehicle;
determining whether to display a character or to execute control commands according to a direction, a start location, and a time difference among the sensed plurality of sub gestures; and
displaying a character corresponding to a gesture including a first sub gesture and a second sub gesture through the one character input interface upon a determination that a difference between a direction of a first sub gesture of the plurality of sensed sub gestures and a direction of a second sub gesture sensed within a first delay time period starting at a time at which the first sub gesture ends is greater than or equal to a reference direction difference,
wherein the step of displaying the character comprises:
upon a determination that the difference between the direction of the first sub gesture and the direction of the second sub gesture is smaller than the reference direction difference, and upon a determination that a difference between a start location of the first sub gesture and a start location of the second sub gesture is greater than or equal to a reference start location difference, displaying the character corresponding to the gesture including the first sub gesture and the second sub gesture through the character input interface,
wherein upon the determination that the difference between the direction of the first sub gesture and the direction of the second sub gesture is smaller than the reference direction difference, and upon a determination that the difference between the start location of the first sub gesture and the start location of the second sub gesture is smaller than the reference start location difference, controlling the character input interface sequentially according to control commands respectively corresponding to the first sub gesture and the second sub gesture;
wherein the method further comprises:
storing the plurality of sensed sub gestures sequentially in a first buffer of the vehicle; and
simultaneously storing a plurality of control commands corresponding to the plurality of sensed sub gestures in a second buffer of the vehicle.

9. The method according to claim 8, wherein the step of sequentially controlling the one character input interface comprises: upon the determination that the difference between the start location of the first sub gesture and the start location of the second sub gesture is smaller than the reference start location difference, and upon a determination that a difference between a speed of the first sub gesture and a speed of the second sub gesture is smaller than a reference speed difference, controlling the one character input interface sequentially according to the control commands respectively corresponding to the first sub gesture and the second sub gesture.

10. The method according to claim 8, wherein the step of sequentially controlling the one character input interface comprises: upon the determination that the difference between the start location of the first sub gesture and the start location of the second sub gesture is smaller than the reference start location difference, and upon a determination that a difference between a length of the first sub gesture and a length of the second sub gesture is smaller than a reference length difference, controlling the one character input interface sequentially according to the control commands respectively corresponding to the first sub gesture and the second sub gesture.

11. The method according to claim 8, wherein the step of sequentially controlling the one character input interface comprises controlling the one character input interface according to a control command corresponding to the first sub gesture, and then controlling the one character input interface according to a control command corresponding to the second sub gesture, when a third sub gesture is sensed within the first delay time period starting at a time at which the first sub gesture ends, or just after the first delay time period elapses from the time at which the first sub gesture ends.

12. The method according to claim 8, wherein the step of displaying the character comprises: upon a determination that there is no control command corresponding to at least one of the first sub gesture and the second sub gesture, displaying the character corresponding to the gesture including the first sub gesture and the second sub gesture through the one character input interface.

13. The method according to claim 8, wherein the step of displaying the character comprises displaying the character corresponding to the gesture including the first sub gesture and the second sub gesture through the one character input interface, just after a second delay time period elapses from a time at which the gesture ends, wherein the second delay time period is longer than the first delay time period.

14. The method according to claim 13, further comprising: upon a determination that no sub gesture is sensed within the second delay time period from a time at which a fourth sub gesture of the plurality of sensed sub gestures ends, controlling the one character input interface according to a control command corresponding to the fourth sub gesture.

15. A vehicle, comprising:
    a display configured to provide one character input interface; and
    a touch input apparatus including a touch pad and configured to sense a plurality of sub gestures sequentially through the touch pad,
    wherein the vehicle is configured to:
        determine whether to display a character or to execute control commands according to a direction, a start location, and a time difference among the sensed plurality of sub gestures, and
        display a character corresponding to a gesture including a first sub gesture and a second sub gesture on the one character input interface, when a difference between a direction of the first sub gesture of the plurality of sensed sub gestures and a direction of the second sub gesture sensed within a first delay time period starting at a time at which the first sub gesture ends is greater than or equal to a reference direction difference,
    wherein the vehicle further comprises a storage device including a first buffer configured to store the plurality of sensed sub gestures sequentially, and a second buffer configured to store a plurality of control commands corresponding to the plurality of sensed sub gestures simultaneously,
    wherein upon a determination that the difference between the direction of the first sub gesture and the direction of the second sub gesture is smaller than the reference direction difference, and if a difference between a start location of the first sub gesture and a start location of the second sub gesture is greater than or equal to a reference start location difference, the vehicle controls the character input interface to display the character corresponding to the gesture including the first sub gesture and the second sub gesture, and
    wherein upon a determination that the difference between the direction of the first sub gesture and the direction of the second sub gesture is smaller than the reference direction difference, and upon a determination that the difference between the start location of the first sub gesture and the start location of the second sub gesture is smaller than the reference start location difference, the vehicle controls the character input interface sequentially according to control commands respectively corresponding to the first sub gesture and the second sub gesture.

* * * * *